United States Patent
Heidler et al.

(10) Patent No.: US 8,371,761 B2
(45) Date of Patent: Feb. 12, 2013

(54) END-PIECE ADAPTOR FOR A COATED OPTICAL FIBER AND PROTECTIVE HOUSING

(75) Inventors: Christian Heidler, Hohenschaeftlarn (DE); Rainer Matthias Kossat, Aschau (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 13/292,347

(22) Filed: Nov. 9, 2011

(65) Prior Publication Data

US 2012/0057837 A1    Mar. 8, 2012

Related U.S. Application Data

(63) Continuation of application No. PCT/EP2010/056604, filed on May 12, 2010.

(30) Foreign Application Priority Data

May 15, 2009    (EP) .............................. 202009007026

(51) Int. Cl.
*G02B 6/36* (2006.01)
(52) U.S. Cl. ................. 385/53; 385/60; 385/70; 385/88
(58) Field of Classification Search .................. None
See application file for complete search history.

(56) References Cited

U.S. PATENT DOCUMENTS

| | | | | |
|---|---|---|---|---|
| 4,812,008 A | * | 3/1989 | Tokumaru et al. | 385/70 |
| 5,469,611 A | | 11/1995 | Sasaki et al. | 29/426.2 |
| 6,273,990 B1 | | 8/2001 | Bookbinder et al. | 156/344 |
| 2005/0226566 A1 | * | 10/2005 | Sasaki et al. | 385/55 |
| 2008/0107381 A1 | * | 5/2008 | Nishioka et al. | 385/60 |

FOREIGN PATENT DOCUMENTS

| | | |
|---|---|---|
| FR | 2614142 | 10/1988 |
| FR | 2741162 | 5/1997 |

* cited by examiner

*Primary Examiner* — Charlie Peng
*Assistant Examiner* — Mary El Shammaa
(74) *Attorney, Agent, or Firm* — C. Keith Montgomery

(57) ABSTRACT

A multipart end-piece adaptor that holds a fiber for stripping, cleaning and splicing that converts into a protective housing for the spliced fiber includes a first adaptor part having a guide sleeve and a second adaptor part that cooperates with the first adaptor part, the second adaptor part having a stripping apparatus. The second adaptor part can be a consumable that, once actuated and removed to strip the fiber, cut the fiber and clean the fiber in one action may be discarded. A further adaptor part engages two first adaptor parts with a guide opening for a coated optical fiber to form a protective housing around the spliced optical fiber.

14 Claims, 5 Drawing Sheets

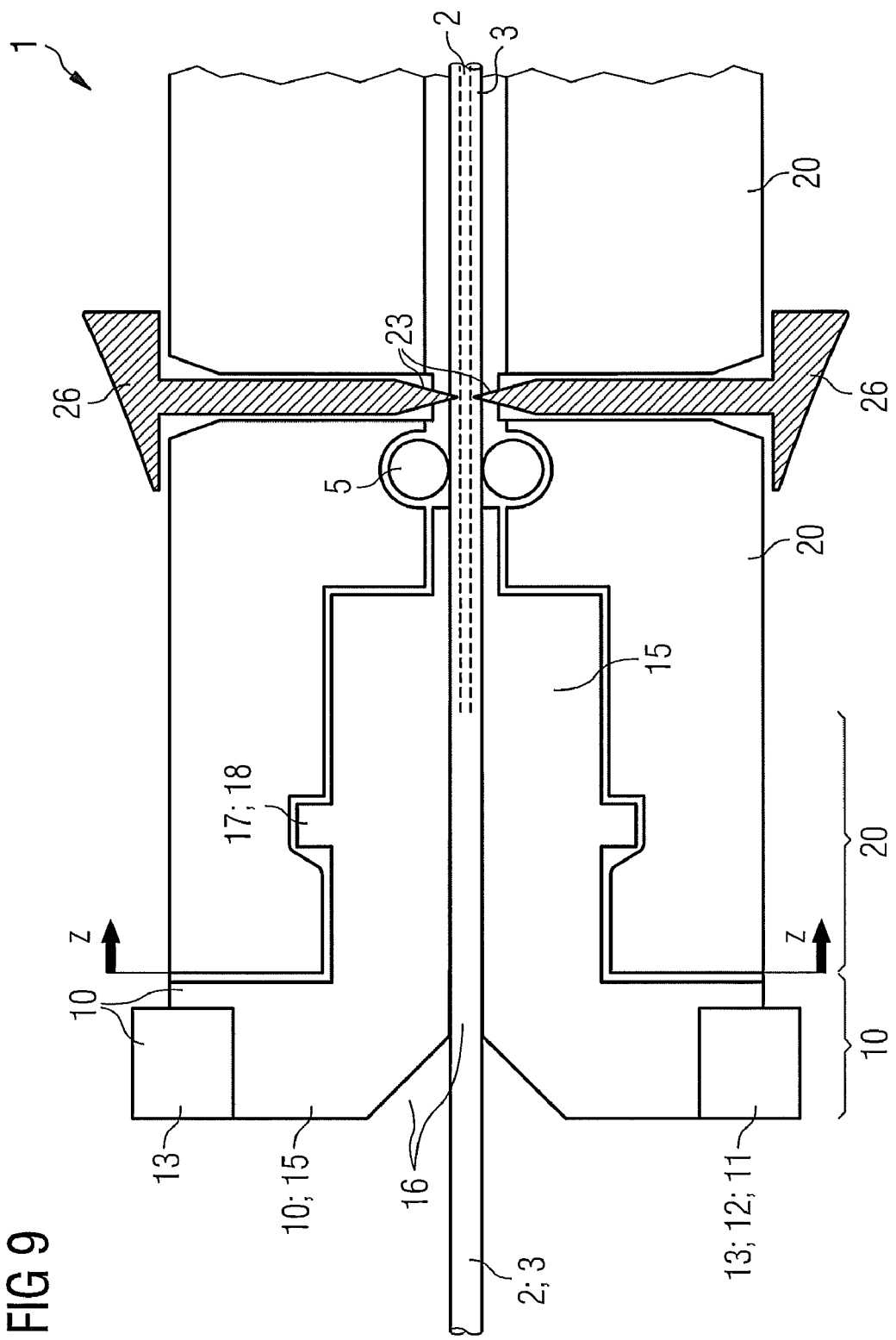

END-PIECE ADAPTOR FOR A COATED OPTICAL FIBER AND PROTECTIVE HOUSING

RELATED APPLICATIONS

This application is a continuation of International Application No. PCT/EP10/056604 filed May 12, 2010, which claims the benefit of priority to European Application No. 202009007026.3, filed May 15, 2009, both applications being incorporated herein by reference.

BACKGROUND

The disclosure relates to the field of splicing of optical waveguides, in order to connect the end pieces of two optical fibers to one another and thus to make a connection which is suitable for optical transmission. In the case of engagement such as this, various preparatory steps must be carried out first of all, before the actual splicing process, in order to prepare the end pieces of the two optical fibers. During this process, the coating on each of the fibers is removed on the end piece of the respective optical waveguide, that is to say it is first of all cut through and is then stripped off In addition to this so-called stripping process, it is generally also necessary to clean the optical fiber exposed thereby at the end.

Traditionally, the two steps are carried out using different auxiliary tools, or at least in different units of a corresponding preparation appliance. Furthermore, the outermost end of the exposed end piece must be cut off straight with a clean cut (so-called "cleaving"), in order to ensure a complete fusing of both end pieces over the entire cross-sectional area of the optical fibers during the subsequent splicing process. The splicing process ("fusion splicing") is finally carried out, normally in a separate appliance, the actual splicer, in which process both end pieces are fused to form a single continuous optical fiber (optical waveguide). After this, the spliced connection must be protected against external light incidence and other influences and to this end must be provided with a suitable protective housing, which encloses the spliced connection that has been produced.

The above processing steps are traditionally carried out using different instruments, with a protective housing being fitted in the fifth and final step, and remaining permanently on the spliced connection that is produced. High-quality instruments are used for the previous four processing steps and must be constructed with adequate precision in order to guarantee the precision that is required, bearing in mind the small diameter of the optical fibers, even after many years of use, that is to say wear, of these appliances.

The disadvantages are not only the production effort associated with this for the appliances themselves but also the multiplicity of actions which are required for the respective processing steps. In particular, the end pieces of the two optical fibers which are to be spliced to one another are mounted a number of times on different appliances or appliance units during the processing procedure as sketched above, in each of which they are positioned with high precision in an accurate position.

SUMMARY

The disclosure considerably reduces the effort of production and the costs for the splicing of optical waveguides and for the further preparatory and subsequent steps associated therewith. One particular aim is to provide equipment which considerably simplifies the handling of the end pieces of the optical fibers and makes it possible to reduce the time required to produce a single spliced connection. Such equipment is embodied in the disclosure, namely a multipart end-piece adaptor which can be fitted to an end piece of a coated optical fiber, comprising a first adaptor part, wherein the first adaptor part has a guide sleeve with a guide opening through which a coated optical fiber can be passed; and a second adaptor part, wherein the second adaptor part has a stripping apparatus, by means of which a fiber coating on an optical fiber can be removed from a part of the end piece of the optical fiber, wherein the second adaptor part surrounds the guide sleeve of the first adaptor part, and can be pulled off the guide sleeve.

According to one embodiment, a multipart adaptor is proposed which for the first time makes it possible to carry out all of the handling steps required for splicing, from stripping of the fiber coating to permanent encapsulation of the spliced connection, without any intermediate replacement, removal or refitting of further holders or other aids directly on the fiber ends being required. Instead of this, once the end-piece adaptor of the disclosure has been fitted to the fiber end, it makes it possible to carry out all the method steps with the aid of the adaptor, since its first adaptor part also remains on the optical fiber after the splicing process, and forms a component of the permanent protective encapsulation. In particular, the end-piece adaptor described here can also be produced as a disposable product. It not only reduces the effort of production for splicing but also the production costs overall, since there is no longer any need to take account of many years of wear with regard to the choice of material and the manufacturing tolerances, as in the case of conventional products for multiple use.

The proposed end-piece adaptor comprises two separate adaptor parts, wherein the first adaptor part has a guide opening for the coated optical fiber. After being fitted to the optical fiber, the first adaptor part remains permanently thereon; this first adaptor part is therefore used to hold and guide the optical fiber, for example during shortening of the optical fiber (cleaving) and in particular during splicing. For this purpose, the first adaptor part just needs to be inserted into a corresponding receptacle of a cutting apparatus or of a splicer (or of a combined appliance for both method steps). The insertion of the adaptor into the corresponding receptacle is considerably less complicated than handling of the flexible fiber end piece on its own, since the first adaptor part ensures both lateral guidance and correct axial positioning of the fiber end piece.

The second adaptor part is designed such that it surrounds the guide sleeve of the first adaptor part, and can be pulled off it. The second adaptor part has a stripping apparatus for removal of the fiber coating from a part of the end piece of the optical fiber. After stripping and, if necessary, cleaning of the fiber end from which the coating has been removed, the second adaptor part can be pulled off the guide sleeve of the first adaptor part, and thrown away. It is likewise feasible for the fiber coating to be stripped off at the same time by the process of pulling the second adaptor part off the first adaptor part, and for the fiber end from which the coating has been removed also to be cleaned during this process.

In both cases, the end-piece adaptor allows a time-saving embodiment of the stripping process, preferably in combination with the cleaning step.

With regard to the first adaptor part, this adaptor part preferably has a locking mechanism, in order to lock its position along the inserted optical fiber. For this purpose, a locking element can be provided which surrounds the guide sleeve at least over part of its axial extent in an annular shape and can be rotated with respect to it. By way of example, the locking mechanism may be an eccentric in which two touching surfaces with a non-circular symmetrical circumference (for example ellipses) are rotated with respect to one another. Depending on the rotation position, this allows an inner contact surface of the annular locking element to be clamped onto an outer surface of the first adaptor part, or its guide sleeve, and to be detached again. A screw thread can also be provided as a locking mechanism, instead of an eccentric. In both cases, the cross section of the guide opening is preferably narrowed locally, thus ensuring secure positioning of the fiber end piece with respect to any tensile loads.

The second adaptor part preferably has a holder and a gripping clamp. The holder can be pushed onto the guide sleeve of the first adaptor part, and will preferably have already been pushed onto it in the delivery state. The holder makes it possible to cut through and pull off the fiber coating end with the aid of the gripping clamp, which for this purpose can be pulled out of the holder in the axial direction. The axial movement distance can in this case be limited such that the gripping clamp can move only through a predetermined displacement distance with respect to the holder. Alternatively, the gripping clamp can be pulled completely out of the holder.

The gripping clamp has a plurality of blades, preferably two blades arranged on opposite sides of the fiber end piece, which can be pressed together with the aid of the gripping clamp in order to locally cut through the fiber coating. By way of example, blades with a semicircular cutout, whose closed diameter corresponds to that of the optical waveguide without a coating, are suitable for this purpose. Furthermore, the second adaptor part may have an end stop which fixes and limits the length of the fiber end which can be pushed through the guide opening in the first adaptor part. After the end-piece adaptor has been mounted on the fiber end piece, the contact surface to be spliced is therefore located in a predetermined axial position with respect to the guide sleeve.

One embodiment provides that the end-piece adaptor has an annular cleaning element around the guide sleeve which is wiped over the fiber end from which the coating has been removed while the two adaptor parts are being pulled apart from one another, thus cleaning the optical fiber. The method steps of stripping and cleaning can therefore be carried out using the same appliance or the same disposable adaptor, that is to say in a more time-saving and more cost-effective manner than was traditionally the case. The annular cleaning element is preferably pre-stretched such that it contracts when being stripped off the guide sleeve to a diameter which corresponds to the diameter of the optical fiber without a coating. Thus, while the coating piece which has been cut off is being stripped off, the outer surface of the fiber is automatically cleaned. The annular cleaning element which, for example, is a sponge or a rubber ring, can be impregnated or coated with a cleaning liquid as well, in order to assist the cleaning effect. In addition, the cleaning element allows simple and cost-effective fixing of the second adaptor part to the first in the axial direction; in the delivery state, the cleaning sponge or cleaning ring ensures that there is a certain amount of resistance to the second adaptor part being pulled off the first, by which means the multipart end-piece adaptor is additionally held together.

The mechanism and design of the end-piece adaptor proposed here make it possible to produce the first and the second adaptor part from plastic and therefore considerably more cost-effectively without any need to be concerned about adjustment inaccuracies and wear, as in the case of traditional appliances for multiple use and for permanent use.

Each fiber end which is provided and treated with the adaptor according to the disclosure is subsequently prepared for carrying out the splicing process, and even for the final securing of the spliced connection. All that is needed to do this is for the first adaptor parts, which are still fitted on both sides of the spliced connection, of two adaptor end pieces to be firmly connected to one another in order to provide permanent encapsulation for protection of the spliced connection.

This other aspect of the disclosure is therefore likewise achieved by a protective housing which has two first adaptor parts (of originally two end-piece adaptors) as well as a further adaptor part. In this case, the two first adaptor parts are mounted on the further adaptor part, to be precise on its two opposite axial ends, such that the further adaptor part surrounds the spliced connection in an annular shape. Annular cut-outs can be provided on the further adaptor part for secure attachment of all three adaptor parts, in which cut-outs annular projections on the two first adaptor parts engage. Conversely, of course, it is also possible for annular projections on the further adaptor part to engage in annular cut-outs in the first adaptor parts. In each case, the further adaptor part forms a secure covering on the spliced connection.

By way of example, the further adaptor part may have two half-cylindrical housing parts, which can be fitted to one another or are attached to one another from the start, for example by means of a joint connection which can pivot. Furthermore, a cushion for the spliced connection can be provided in the interior of the half-shells of the further adaptor part, for example composed of a gel or some other soft material. The further adaptor part preferably surrounds not only the spliced connection but also the guide sleeves of the two first adaptor parts, axially on both sides of the spliced connection.

Finally, a multipart set of adaptor parts is also provided, which has two end-piece adaptors (each having a first and a second adaptor part) and the further adaptor part. Once the second adaptor parts have been removed, the further adaptor part allows the two first adaptor parts to be fixed to one another in mutually opposite orientations, and the secure enclosure of the spliced connection.

DESCRIPTION OF THE DRAWINGS

A number of exemplary embodiments will be explained in more detail in the following text with reference to the Figures, in which:

FIG. 9 shows a schematic longitudinal sectional view, in the form of a detail, of one embodiment of the end-piece adaptor.

DETAILED DESCRIPTION

Figure 1:
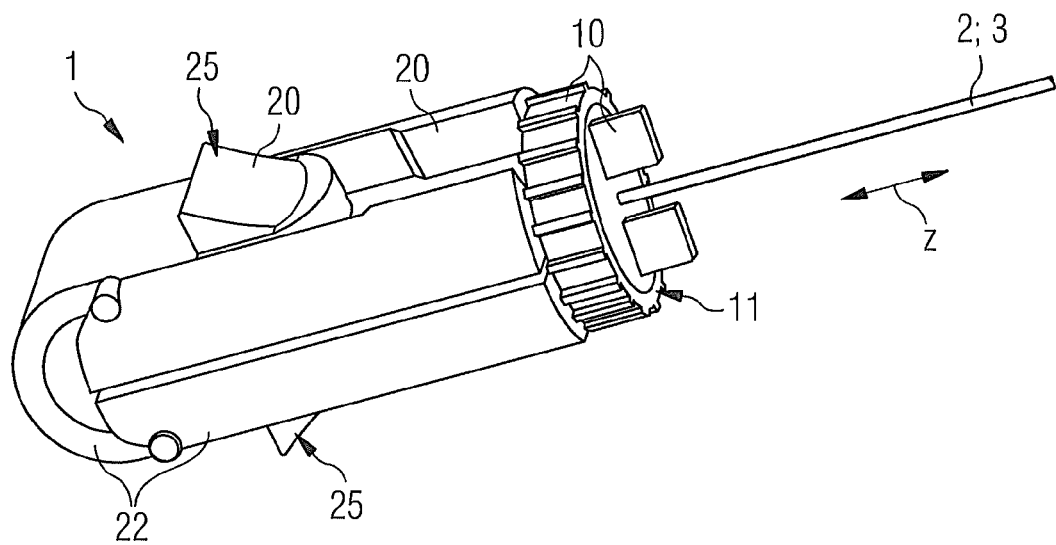
FIG. 1 shows one exemplary embodiment of an end-piece adaptor having a first and a second adaptor part, mounted on the end piece of an optical fiber.

FIG. 1 shows a perspective illustration of a schematic exemplary embodiment of an end-piece adaptor 1 which has been pushed onto the end piece of an optical fiber 2 provided with a fiber coating 3. The end-piece adaptor 1 has a first adaptor part 10 and a second adaptor part 20. The second adaptor part 20 has a stripping apparatus 25, which will also be explained with reference to the following Figures.

The first adaptor part 10 is used not only to guide the optical fiber 2 but also to fix the end-piece adaptor 1 on the optical fiber 2 in the axial direction z.

Figure 2:
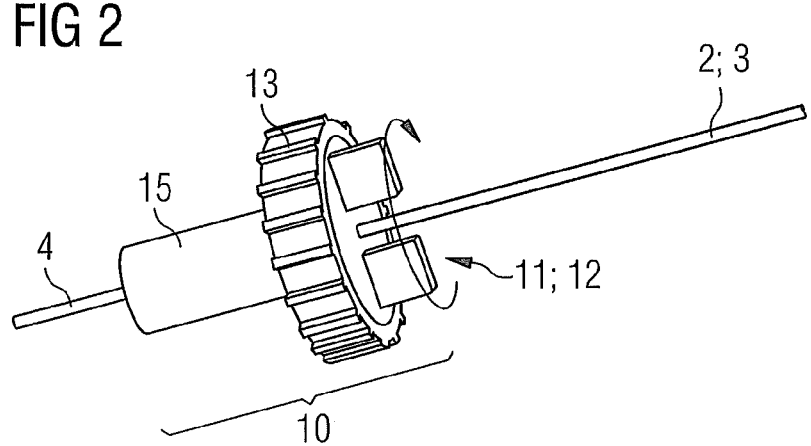
FIG. 2 shows the first adaptor part of the end-piece adaptor from FIG. 1.

In this context, FIG. 2 shows the first adaptor part 10, through which the end piece 4 of the optical fiber 2 is pushed, together with the fiber coating 3. The first adaptor part 10 essentially forms a guide sleeve 15, whose guide opening is filled by the coated optical fiber 2. In the right-hand insertion area of the guide opening 15, this opening is provided with slots or other cut-outs, in order to reduce the cross section of the guide opening and thus to allow the optical fiber to be clamped firmly. A locking mechanism 11, for example an eccentric 12 or a screw mechanism, is provided for this purpose.

In this context, the first adaptor part 10 has an annular locking element 13, which is arranged such that it can rotate around the guide sleeve 15 and reduces the cross section of the guide opening in the outer area of the guide sleeve 15, depending on the angular position, as indicated by the curved arrow. The guide sleeve and the locking element 13 can be rotated with respect to one another with the aid of gripping elements (illustrated on the right in FIG. 2). In the locked state, the optical fiber 2 can no longer be moved with respect to the first adaptor part 10 in the axial direction z.

Figure 3:
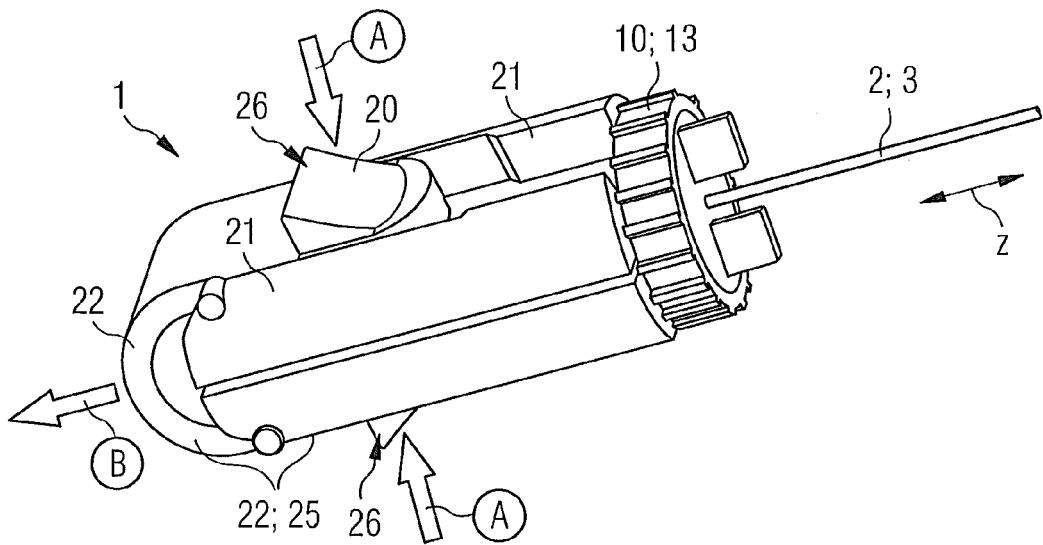
FIG. 3 shows the sequence of the handling steps for stripping the fiber coating by means of the second adaptor part of the end-piece adaptor from FIG. 1.

FIG. 3 shows the end-piece adaptor 1 from FIG. 2, with a schematic illustration of two handling steps A and B for stripping, that is to say for stripping the fiber coating of the end piece of the optical fiber. The stripping apparatus 25 of the second adaptor part 20 has a gripping clamp 22, which can be pulled out in the axial direction z from a holder 21 which surrounds the guide sleeve 15 of the first adaptor part 10. Pulling the gripping clamp 22 out axially away from the holder and/or the first adaptor part 10 is indicated by the movement B. Prior to this, however, and as indicated by the arrows A in FIG. 3, the two gripping elements 26 of the gripping clamp 22 are pressed together. This results in the coating on the optical fiber being cut through locally, as can be seen in more detail in FIG. 4.

Figure 4:
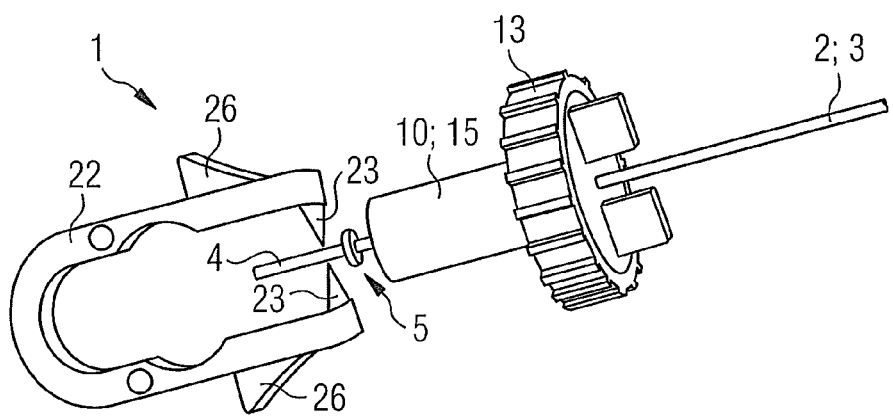
FIG. 4 shows an illustration of the interior of the end-piece adaptor, without the holder that is part of the second adaptor part.

FIG. 4 shows the interior of the end-piece adaptor 1; the holder 21 has not been illustrated in this case, in order to improve the illustration. However, the figure shows the gripping clamp 22 in that position which it assumes before carrying out the handling steps A, B (FIG. 3) relative to the end piece 4 of the optical fibers 2, 3 and relative to the first adaptor part 10. FIG. 4 shows two blades 23 which face one another in the interior of the end-piece adaptor, are arranged on both sides of the end piece 4 and are used to locally cut through the fiber coating 3 in order subsequently to allow it to be pulled off the optical fiber 2 in the axial direction. In order to cut through it, the two gripping elements 26 of the gripping clamp 22 are pushed against one another, as a result of which the blades 23 cut through the fiber coating 3 (handling step A in FIG. 3). The gripping clamp 22 is then pulled out of the holder 21 (FIG. 3), on its two gripping elements 26 (step B in FIG. 3). During this movement, the two gripping elements 26 and therefore the two blades 23 as well still remain pushed against one another in order that the optical fiber 2, that is to say the optical waveguide itself, is exposed on its end piece 4.

FIG. 4 also shows a development of the end-piece adaptor 1, according to which a cleaning element 5 is provided. The cleaning element 5 is illustrated in an area behind the guide sleeve 15; alternatively, it can likewise also be stretched around the guide sleeve 15 (at least in the original delivery state). In any case, however, the annular cleaning element 5 is wiped over the stripped end piece 4 of the optical fiber 2 when the second adaptor part 20 or at least its gripping clamp 22 is pulled off, thus also removing any contamination, for example cut-off residue of the fiber coating. The cleaning element 5 is preferably a stretched, annular sponge or rubber ring, which is preferably impregnated or coated with a chemical cleaning solution, as well.

Only the two handling steps A and B as shown in FIG. 3 are required to operate the end-piece adaptor, before the second adaptor part 20 overall is pulled off the first adaptor part 10, likewise in the same axial direction z as in handling step B. In contrast, the first adaptor part 10 still remains on the optical fiber, which is now prepared for the splicing process, and can furthermore also remain permanently on the spliced fiber. In order to make the connection, two fibers which have been prepared with the aid of the end-piece adaptor 1 and are also each fitted with a first adaptor part 10 just need to be inserted into corresponding receptacles in a splicer, and spliced to one another.

Figure 5:
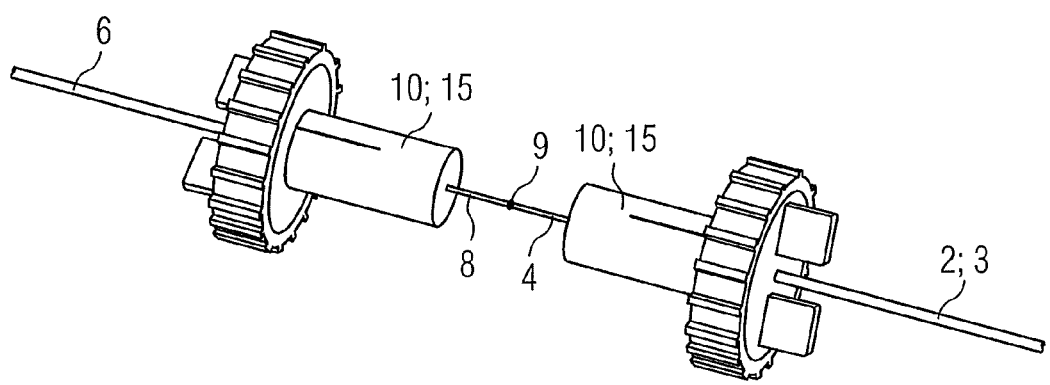
FIG. 5 shows a spliced connection surrounded by two first adaptor parts.

FIG. 5 illustrates the result of the splicing process. The respective end pieces 4, 8 of two coated optical fibers 2, 6 are illustrated on both sides of the spliced connection 9. The first adaptor part 10 of the further end piece 8 (the further optical fiber 6 to which the optical fiber 2 from FIGS. 1 to 4 has been spliced) is arranged in the opposite orientation to the first adaptor part 10 of the optical fiber 2.

Figure 6:
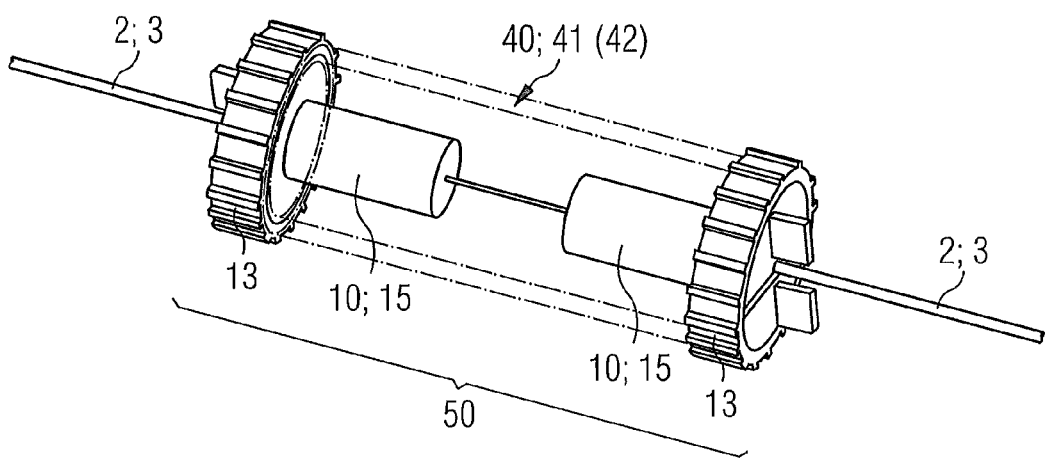
FIG. 6 shows a protective housing for the spliced connection from FIG. 5.

As illustrated in FIG. 6, the mutually facing sleeves 15 of the two adaptor parts 10 just need to be fixed in a fixed relative position with respect to one another in order to create a protective housing 50 which is suitable to be left permanently on the spliced connection that has been made. As shown in FIG. 6, in addition to the two first adaptor parts 10, a further adaptor part 40 is also provided, which surrounds the two guide sleeves 15 and the spliced connection arranged between them. The further adaptor part 40 preferably has two essentially half-cylindrical housing parts 41, 42, only one of which is illustrated in FIG. 6.

Figure 7:
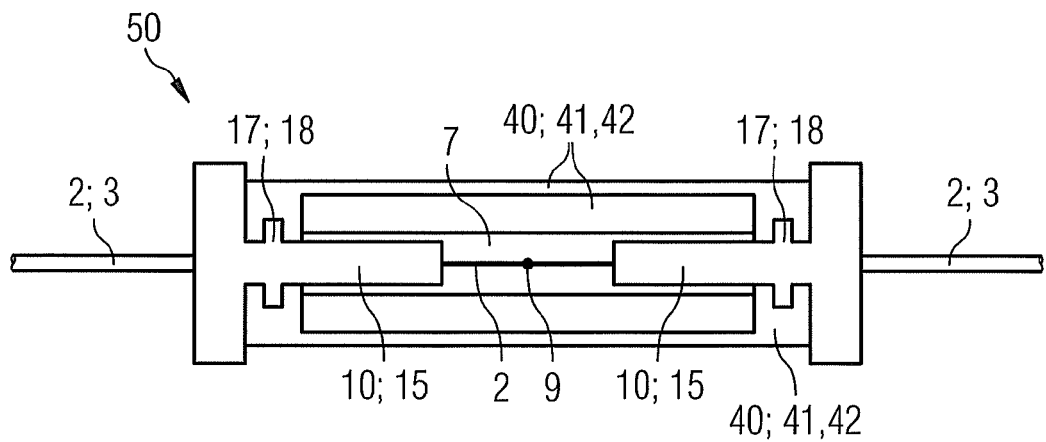
FIG. 7 shows a schematic longitudinal sectional view through the protective housing from FIG. 6.

FIG. 7 shows a schematic longitudinal section view through the protective housing 50 from FIG. 6, in the finished, closed state. In the axial direction, the spliced connection 9 is now completely surrounded by the two half-cylindrical housing parts 41, 42 of the further adaptor part 40. Furthermore, the two first adaptor parts 10 are mounted on the further adaptor part 40. Corresponding annular projections 17 on the guide sleeves 15 and corresponding annular cut-outs 18 in the further adaptor part 40 are used for this purpose (or vice versa).

Figure 8:
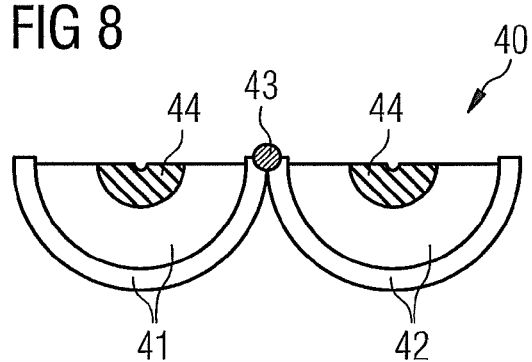
FIG. 8 shows a schematic cross-sectional view of the further adaptor part for the protective housing from FIG. 6, illustrated in the open state.

FIG. 8 shows a schematic cross-sectional view through the further adaptor part 40, which is initially still open, according to an embodiment in which the two half-cylindrical housing parts 41, 42 are mounted on one another with the aid of a joint connection 43 which can pivot. In addition, a cushion 44 is provided in the interior of the housing parts 41, 42, and surrounds the spliced connection when the further adaptor part 40 is in the closed state. The protective housing 50 which is created after the closing of the further adaptor part 40 and likewise comprises the two first adaptor parts 10 remains permanently on the spliced connection.

The procedure which has been described with reference to FIGS. 1 to 8 involves considerably fewer and simpler handling steps for insertion and positioning of the fiber ends to be spliced to one another in the processing appliances (in particular for splicing and encapsulation) than a conventional method. Furthermore, the handling of the fiber ends and the stripping of their insulation (and preferably also the simultaneous cleaning) are carried out exclusively with the aid of adaptor parts which can be designed as disposable products, and in particular can be produced from plastic. Since no material wear whatsoever occurs in this case, as in the case of the many years of wear that otherwise occur with operator devices that are used repeatedly, the adaptor parts can be produced considerably more cost-effectively.

FIG. 9 shows a schematic longitudinal section view, in the form of a detail, through one embodiment of an end-piece adaptor 1, in which the internal design is illustrated enlarged, but not to scale. The optical fiber 2, provided with the fiber coating 3, runs in the interior of the guide opening 16 of the first adaptor part 10. On the right-hand side in FIG. 9, where the coated fiber emerges from the guide sleeve 15 again, it is surrounded by the second adaptor part 20, only part of which is illustrated in FIG. 9. In addition, the precise shape of the gripping clamp and of the holder are not illustrated in detail here. The two gripping elements 26 of the gripping clamp are illustrated, which project into the interior of the second adaptor part 20 and are each fitted with a blade 23. When the two gripping elements 26 are pressed together, the blades 23 cut into the fiber coating 3 and therefore cut through it. When the gripping clamp is pulled out (with the gripping elements 26 still pressed together), or at the latest when the second adaptor part 20 is pulled off completely from the first adaptor part 10, that part of the fiber coating 3 which has been cut off by the blades 23 on the right is stripped from the optical fiber 2, and is therefore removed. At the same time, the second adaptor part 20 also preferably drives the cleaning element 5 with it which is thus likewise itself pushed in the axial direction z, in the same way as the second adaptor part 20. The axial direction z is indicated by two arrows in FIG. 9. When the cleaning element 5 is being driven, it finally contracts to the diameter of the end piece of the optical fiber 2 from which the fiber coating 3 has been removed, and thus cleans the optical fiber 2. Apart from this, the cleaning element 5 is designed as already described above.

As shown in FIG. 9, the cleaning element 5 is arranged in a cutout in the inner wall of the second adaptor part 20 and is mounted after the guide sleeve 15 of the first adaptor part 10. When the optical fiber is inserted into the end-piece adaptor 1 which comprises the adaptor parts 10 and 20, the optical fibers 2, 3 are therefore passed through the cleaning element 5. Mechanical securing elements such as an annular projection 17 or an annular cutout 18 in the first and second adaptor parts (or vice versa) initially hold the two adaptor parts 10, 20 together until—after the simultaneous stripping and cleaning—the second adaptor part is completely pulled off the first adaptor part 10.

The position of the annular projections 17 and cut-outs 18 may in particular be chosen such that the same annular projection 17 on the first adaptor part 10 subsequently, during assembly of the protective housing 50 with the aid of the further adaptor part 40, engages in a corresponding annular cut-out 18 in the further adaptor part 40 (compare FIG. 7).

Figure 10:
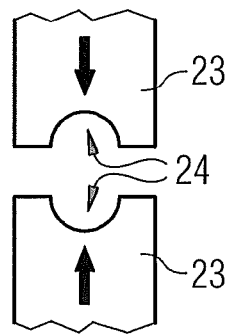
FIG. 10 shows a cross-sectional view of the arrangement of the blades of the end-piece adaptor from FIG. 9.

With regard to the position of the cleaning element 5 in FIG. 9, it is also alternatively possible to provide for the cleaning element 5 and the cut-out, which surrounds it, in the second adaptor part 20 to surround the guide sleeve 15 of the first adaptor part FIG. 10, for example on the projection of the guide sleeve 15, which is illustrated on the extreme right in FIG. 9, and is considerably reduced radially. In this case, the pre-stretched cleaning element 5 itself prevents the second adaptor part 20 from sliding off the first adaptor part 10, as a result of which there is no need for the mechanical securing elements 17, 18. However, these may, of course, additionally still be provided. When the cleaning element 5 is arranged on a projection of the guide sleeve 15, the coated optical fiber 2, 3 can be inserted into the end-piece adaptor 1 more easily, since the cleaning element 5 is pre-stretched from the start by the guide sleeve 15 and its projection, which points inwards.

FIG. 10 shows a cross-sectional view of the two blades 23 from FIG. 9, illustrated from the axial viewing direction. The two blades 23 each have semicircular cut-outs 24, whose diameter corresponds to the diameter of the optical fiber 2 without a coating. When the blades 23 are pressed together with the aid of the gripping elements 26 from FIG. 9, only the fiber coating 3 is therefore cut through.

In addition, a method is provided, which comprises fitting of a multipart end-piece adaptor to an end piece of a coated optical fiber, wherein the end-piece adaptor has a first adaptor part with a guide sleeve for the coated optical fiber and a second adaptor part with a stripping apparatus for stripping a fiber coating of the optical fiber. Also, stripping of the fiber coating with the aid of the second adaptor part and separation of the second adaptor part from the first adaptor part. Furthermore, temporary fitting of the first adaptor part at least to a splicing device and production of a spliced connection of the optical fiber to a further optical fiber and removal of the first adaptor part together with the optical fiber from the splicing device, and assembly of a protective housing for the spliced connection by mounting the first adaptor and a corresponding first adaptor of the further optical fiber on at least one further adaptor part.

In this method, it is also possible to provide for the second adaptor part to be thrown away once it has been removed from the first adaptor part. Furthermore, two coated optical fibers can be fitted with and processed using two multipiece end-piece adaptors designed in the same way, before the first adaptor parts of the two end-piece adaptors are temporarily fitted to the splicing device, for splicing. After this, the two first adaptor parts together with the splice that has been produced are removed from the splicing device and are connected with the aid of at least one further adaptor part to form a housing which is intended to remain permanently on the splice.

Furthermore, a method is proposed which comprises fitting of two first adaptor parts or two multipart end-piece adaptors, which each have a first adaptor part, to two coated optical fibers; production of a spliced connection between the two optical fibers, wherein the two first adaptor parts remain fitted to the optical fibers; and assembly of a protective housing for the spliced connection, comprising the two first adaptor parts and at least one further adaptor part.

The first adaptor parts preferably each have a guide sleeve for the coated optical fiber. Furthermore—after the fitting of the first adaptor parts or of the multipart end-piece adaptor to the optical fibers—the fiber coatings are preferably stripped off the optical fibers. This can be done in particular with the aid of second adaptor parts of the end-piece adaptor. After use, these can be removed from the first adaptor parts, and thrown away.

The components, elements and method steps mentioned in the above method may in particular be in the same form as the components, elements and method steps with the same names which have been described in this application in the claims, in the introductory part of the description, in the figures and/or in the figure description. In particular, the described adaptor parts may be disposable products, thus reducing the effort of production and the costs for the handling steps as far as encapsulation of the finished spliced connection.

What is claimed is:

1. A multipart end-piece adaptor which can be fitted to an end piece of a coated optical fibre, comprising;
    a first adaptor part, wherein the first adaptor part has a guide sleeve with a guide opening through which a coated optical fibre can be passed; and
    a second adaptor part, wherein the second adaptor part has a stripping apparatus, by means of which a fibre coating on an optical fibre can be removed from a part of the end piece of the optical fibre, wherein
    the second adaptor part surrounds the guide sleeve of the first adaptor part, and can be pulled off the guide sleeve, and
    wherein the end-piece adaptor has an annular cleaning element, which surrounds the guide sleeve of the first adaptor part and, with the aid of the second adaptor part, can be pulled off the guide sleeve and off an end piece, which projects out of the guide sleeve, of an optical fibre in the axial direction (z).

2. The end-piece adaptor according to claim 1, wherein the annular cleaning element is a prestretched rubber ring or sponge, which contracts on removal from the guide sleeve and carries with it any contamination on the surface of the end piece of the optical fibre.

3. The end-piece adaptor according to claim 2, wherein the annular cleaning element is impregnated with a cleaning liquid.

4. The end-piece adaptor according to claim 1, wherein the multipart end-piece adaptor is a disposable product, wherein the first adaptor part is intended to remain permanently on the end piece of an optical fibre, and the second adaptor part is intended to be used only once.

5. The end-piece adaptor according to claim 4, wherein the first adaptor part and the second adaptor part are mounted on one another in the delivery state of the disposable product, wherein the guide sleeve of the first adaptor part is pushed into the second adaptor part, and the annular cleaning element is stretched around the circumference of the guide sleeve.

6. The end-piece adaptor according to claim 5, wherein the first adaptor part and the second adaptor part are composed of plastic and are held together in the delivery state by the annular cleaning element.

7. The end-piece adaptor according to claim 1, wherein the first adaptor part furthermore has a locking mechanism, by means of which the position of the first adaptor part along an inserted optical fibre can be locked.

8. The end-piece adaptor according to claim 7, wherein the locking mechanism of the first adaptor part has a locking element which surrounds at least a part of the guide sleeve in an annular shape and can be rotated with respect to the guide sleeve.

9. The end-piece adaptor according to claim 7, wherein the cross section of the guide opening can be reduced by the locking mechanism of the first adaptor part at that end of the guide sleeve at which the optical fibre can be pushed into the guide sleeve.

10. The end-piece adaptor according to claim 7, wherein the locking mechanism of the first adaptor part has an eccentric.

11. The end-piece adaptor according to claim 1, wherein the second adaptor part has a holder which is pushed or can be pushed onto the guide sleeve of the first adaptor part, and has a gripping clamp for cutting through the fibre coating, wherein the gripping clamp can be pulled out of the holder in the axial direction (z).

12. The end-piece adaptor according to claim 11, wherein the gripping clamp has at least two blades for cutting through the fibre coating, wherein the blades can be moved in the axial direction (z) with the aid of the gripping clamp.

13. The end-piece adaptor according to claim 11, wherein the gripping clamp has two and only two mutually facing blades, each with a semicircular cut-out, which blades can be pushed against one another by gripping elements of the gripping clamp.

14. The end-piece adaptor according to claim 1, wherein the second adaptor part has an end stop which limits the longitudinal section of an optical fibre which is passed through the guide opening in the first adaptor part.

* * * * *